United States Patent
Tran et al.

(10) Patent No.: US 11,113,479 B2
(45) Date of Patent: Sep. 7, 2021

(54) UTILIZING A GATED SELF-ATTENTION MEMORY NETWORK MODEL FOR PREDICTING A CANDIDATE ANSWER MATCH TO A QUERY

(71) Applicant: Adobe Inc., San Jose, CA (US)

(72) Inventors: Quan Tran, San Jose, CA (US); Tuan Manh Lai, San Jose, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 183 days.

(21) Appl. No.: 16/569,513

(22) Filed: Sep. 12, 2019

(65) Prior Publication Data

US 2021/0081503 A1    Mar. 18, 2021

(51) Int. Cl.
| | |
|---|---|
| *G06F 40/00* | (2020.01) |
| *G06F 40/44* | (2020.01) |
| *G06N 5/04* | (2006.01) |
| *G06K 9/62* | (2006.01) |
| *G06F 17/16* | (2006.01) |
| *G06F 16/9032* | (2019.01) |

(52) U.S. Cl.
CPC ........ *G06F 40/44* (2020.01); *G06F 16/90332* (2019.01); *G06F 17/16* (2013.01); *G06K 9/6215* (2013.01); *G06N 5/04* (2013.01)

(58) Field of Classification Search
CPC ...... G06N 3/0454; G06N 3/0445; G06N 3/04; G06N 3/08; G06N 3/0481; G06N 3/02; G06N 7/005; G06F 16/3329; G06F 16/24578; G06F 16/90332; G06F 40/44; G10L 15/16; G10L 15/1815; G10L 15/18; G10L 15/22; G10L 15/285; G10L 15/32

See application file for complete search history.

(56) References Cited

U.S. PATENT DOCUMENTS

| | | | | |
|---|---|---|---|---|
| 10,861,456 | B2* | 12/2020 | Tran | G10L 15/16 |
| 10,997,503 | B2* | 5/2021 | Dohan | G06N 3/086 |
| 2018/0005107 | A1* | 1/2018 | Neil | G06F 15/82 |
| 2020/0090651 | A1* | 3/2020 | Tran | G10L 15/16 |
| 2020/0293874 | A1* | 9/2020 | Ji | G06N 3/08 |

(Continued)

OTHER PUBLICATIONS

Wang, B., Liu, K., & Zhao, J. (Aug. 2016). Inner attention based recurrent neural networks for answer selection. In Proceedings of the 54th Annual Meeting of the Association for Computational Linguistics (vol. 1: Long Papers) (pp. 1288-1297). (Year: 2016).*

(Continued)

*Primary Examiner* — Edgar X Guerra-Erazo
(74) *Attorney, Agent, or Firm* — Keller Jolley Preece

(57) ABSTRACT

The present disclosure relates to systems, methods, and non-transitory computer-readable media that can determine an answer to a query based on matching probabilities for combinations of respective candidate answers. For example, the disclosed systems can utilize a gated-self attention mechanism (GSAM) to interpret inputs that include contextual information, a query, and candidate answers. The disclosed systems can also utilize a memory network in tandem with the GSAM to form a gated self-attention memory network (GSAMN) to refine outputs or predictions over multiple reasoning hops. Further, the disclosed systems can utilize transfer learning of the GSAM/GSAMN from an initial training dataset to a target training dataset.

20 Claims, 9 Drawing Sheets

(56) References Cited

U.S. PATENT DOCUMENTS

| | | | | |
|---|---|---|---|---|
| 2020/0334520 | A1* | 10/2020 | Chen | G06N 3/088 |
| 2020/0401899 | A1* | 12/2020 | Dohan | G06N 3/0454 |
| 2021/0056150 | A1* | 2/2021 | Karandish | G06F 16/24578 |

OTHER PUBLICATIONS

Xu, D., Ji, J., Huang, H., Deng, H., & Li, W. J. (2019). Gated group self-attention for answer selection. arXiv preprint arXiv: 1905.10720. (Year: 2019).*

Wang, W., Yang, N., Wei, F., Chang, B., & Zhou, M. (Jul. 2017). Gated self-matching networks for reading comprehension and question answering. In Proceedings of the 55th Annual Meeting of the Association for Computational Linguistics (vol. 1: Long Papers) (pp. 189-198). (Year: 2017).*

Weijie Bian, Si Kan Li, Zhao Yang, Guang Chen, and Zhiqing Lin. 2017. A compare-aggregate model with dynamic-clip attention for answer selection. In CIKM.

Yu-An Chung, Hung yi Lee, and James R. Glass. 2018. Supervised and unsupervised transfer learning for question answering. In NAACL-HLT.

Jacob Devlin, Ming-Wei Chang, Kenton Lee, and Kristina Toutanova. 2018. Bert: Pre-training of deep bidirectional transformers for language understanding. CoRR, abs/1810.04805.

Bhuwan Dhingra, Hanxiao Liu, William W. Cohen, and Ruslan R. Salakhutdinov. 2017. Gated-attention readers for text comprehension. In ACL.

Tomas Mikolov, Ilya Sutskever, Kai Chen, Greg Corrado, and Jeffrey Dean. 2013. Distributed representations of words and phrases and their compositionality. In Proceedings of the 26th International Conference on Neural Information Processing Systems—vol. 2, NIPS'13, pp. 3111-3119, USA. Curran Associates Inc.

Sewon Min, Min Joon Seo, and Hannaneh Hajishirzi. 2017. Question answering through transfer learning from large fine-grained supervision data. In ACL.

Jeffrey Pennington, Richard Socher, and Christopher D. Manning. 2014. Glove: Global vectors for word representation. In EMNLP.

Matthew E. Peters, Mark Neumann, Mohit Iyyer, Matt Gardner, Christopher Clark, Kenton Lee, and Luke S. Zettlemoyer. 2018. Deep contextualized word representations. In NAACL-HLT.

Jinfeng Rao, Hua He, and Jimmy Lin. 2016. Noise-contrastive estimation for answer selection with deep neural networks. In Proceedings of the 25th ACM International on Conference on Information and Knowledge Management, pp. 1913-1916. ACM.

Gehui Shen, Yunlun Yang, and Zhi-Hong Deng. 2017. Inter-weighted alignment network for sentence pair modeling. In EMNLP.

Sainbayar Sukhbaatar, Jason Weston, Rob Fergus, et al. 2015. End-to-end memory networks. In Advances in neural information processing systems, pp. 2440-2448.

Yi Tay, Anh Tuan Luu, and Siu Cheung Hui. 2017a. Enabling efficient question answer retrieval via hyperbolic neural networks. CoRR, abs/1707.07847.

Yi Tay, Minh C. Phan, Anh Tuan Luu, and Siu Cheung Hui. 2017b. Learning to rank question answer pairs with holographic dual lstm architecture. In SIGIR.

Yi Tay, Luu Anh Tuan, and Siu Cheung Hui. 2018. Multi-cast attention networks. In KDD.

Harish Tayyar Madabushi, Mark Lee, and John Barnden. 2018. Integrating question classification and deep learning for improved answer selection. In Proceedings of the 27th International Conference on Computational Linguistics, pp. 3283-3294, Santa Fe, New Mexico, USA. Association for Computational Linguistics.

Quan Hung Tran, Gholamreza Haffari, and Ingrid Zukerman. 2017. A generative attentional neural network model for dialogue act classification. In Proceedings of the 55th Annual Meeting of the Association for Computational Linguistics (vol. 2: Short Papers), pp. 524-529.

Quan Hung Tran, Tuan Lai, Gholamreza Haffari, Ingrid Zukerman, Trung Bui, and Hung Bui. 2018. The context-dependent additive recurrent neural net. In NAACL-HLT.

Kateryna Tymoshenko and Alessandro Moschitti. 2018. Cross-pair text representations for answer sentence selection. In Proceedings of the 2018 Conference on Empirical Methods in Natural Language Processing, pp. 2162-2173, Brussels, Belgium. Association for Computational Linguistics.

Ashish Vaswani, Noam Shazeer, Niki Parmar, Jakob Uszkoreit, Llion Jones, Aidan N Gomez, Łukasz Kaiser, and Illia Polosukhin. 2017. Attention is all you need. InAdvances in neural information processing systems, pp. 5998-6008.

Mengqiu Wang, Noah A. Smith, and Teruko Mitamura. 2007. What is the jeopardy model? a quasi-synchronous grammar for qa. InEMNLP-CoNLL.

Shuohang Wang and Jing Jiang. 2017. A compare-aggregate model for matching text sequences. CoRR, abs/1611.01747.

Zhiguo Wang, Wael Hamza, and Radu Florian. 2017. Bilateral multi-perspective matching for natural language sentences. InIJCAI.

Yi Yang, Wen tau Yih, and Christopher Meek. 2015. Wikiqa: A challenge dataset for open-domain question answering. In EMNLP.

* cited by examiner

| Model 502 | TrecQA 504a | | WikiQA 504b | |
|---|---|---|---|---|
| | MAP 506 | MRR 508 | MAP 506 | MRR 508 |
| NLPM + GSAMN + Transfer | 0.914 | 0.957 | 0.857 | 0.872 |
| NLPM + Transformers + Transfer | 0.895 | 0.939 | 0.831 | 0.848 |
| NLPM + GSAMN | 0.906 | 0.949 | 0.821 | 0.832 |
| NLPM + Transfer | 0.902 | 0.949 | 0.832 | 0.849 |
| BERT + Transformers | 0.886 | 0.926 | 0.813 | 0.828 |
| ELMo + Compare-Aggregate | 0.850 | 0.898 | 0.746 | 0.762 |
| BERT | 0.877 | 0.922 | 0.810 | 0.827 |
| QC + PR + MP CNN | 0.865 | 0904 | - | - |
| IWAN + sCARNN | 0.829 | 0.875 | 0.716 | 0.722 |
| IWAN | 0.822 | 0.889 | 0.733 | 0.750 |
| Compare-Aggregate | 0.821 | 0.899 | 0.748 | 0.758 |
| BiMPM | 0.802 | 0.875 | 0.718 | 0.731 |
| HyperQA | 0.784 | 0.865 | 0.705 | 0.720 |
| NCE-CNN | 0.801 | 0.877 | - | - |

Fig. 5

UTILIZING A GATED SELF-ATTENTION MEMORY NETWORK MODEL FOR PREDICTING A CANDIDATE ANSWER MATCH TO A QUERY

BACKGROUND

Recent years have seen significant improvements in computer systems with artificial agents for conducting dialogue with users. For example, some conventional systems are now able to have rudimentary conversations with users by answering questions or responding to basic verbal interactions. To do so, these conventional systems have applied the task of answer selection in a variety of different applications. Unfortunately, a number of problems exist with conventional systems that lead to decreased accuracy and flexibility of matching candidate answers to a query.

SUMMARY

Aspects of the present disclosure can include methods, computer-readable media, and systems that utilize a gated self-attention mechanism for matching a candidate answer to a query. The gated self-attention mechanism can condition a gate vector not only on a context vector and a single input but on a sequence of inputs to improve accuracy. In one or more embodiments, the disclosed systems utilize the gated self-attention mechanism to match a candidate answer to a query as part of a larger gated self-attention memory network. The gated self-attention memory network can be a combination of a gated self-attention mechanism and a memory network model architecture. In particular, by utilizing such a combination of model architectures, the disclosed systems can match a candidate answer to query based on combined vector representations of a query and a candidate answer while also accounting for context of the query. In this manner, the disclosed systems can account for relationships and dependencies between the query and the candidate answer throughout the modeling process instead of separate, independent analyses followed by matching efforts. In doing so, the disclosed systems can enhance the captured connections between the query and the candidate answer.

To illustrate, in some embodiments, the disclosed systems can utilize a gated-self attention mechanism that flexibly models interactions between the query, a set of candidate answers, and contextual information. In addition, at each step of the modeling process, the disclosed systems can use the memory network model architecture in tandem with the gated self-attention mechanism to further interpret these interactions to refine what the relationships are between the foregoing inputs. Based on the relationships between the inputs, the disclosed systems can determine a matching probability (i.e., a probability that a given candidate answer is an answer to the query). Furthermore, in some embodiments, the disclosed systems can transfer learning from a large-scale corpus to a target dataset for fine-tuning various learned parameters.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 5 illustrates a table reflecting example experimental results of an answer selection system in accordance with one or more embodiments.

DETAILED DESCRIPTION

Figure 1:
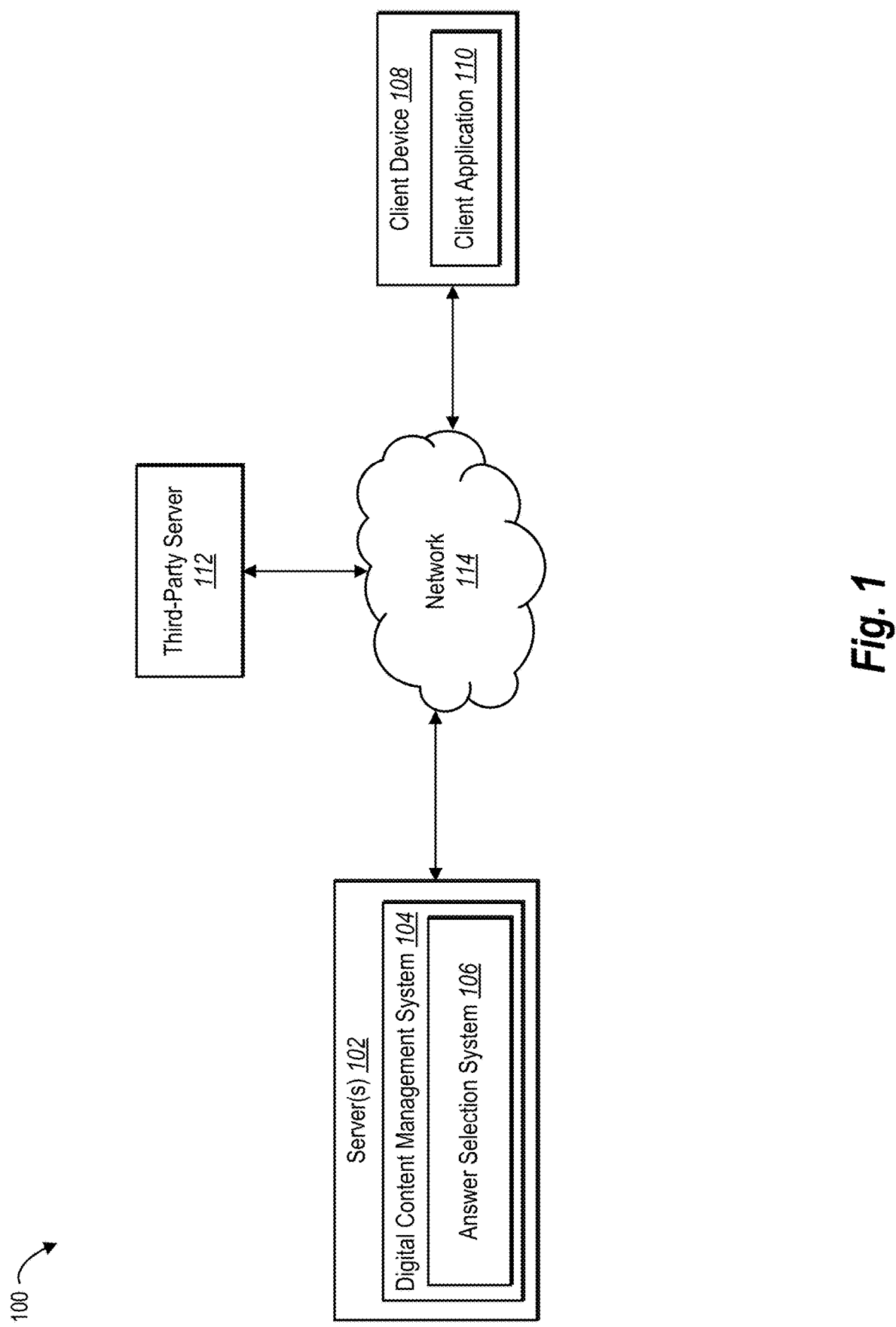
FIG. 1 illustrates a diagram of a system including an answer selection system in accordance with one or more embodiments.

This disclosure describes one or more embodiments of an answer selection system that can utilize a self-attention model architecture and a memory network model architecture to predict an answer to a query. For example, in some embodiments, the answer selection system can utilize the self-attention model architecture to learn a contextual representation of both a query and a candidate answer together. Further, the answer selection system can utilize a memory network model architecture to refine system outputs or predictions over multiple steps. In addition, in some embodiments, the answer selection system can transfer learning from a large-scale corpus to a target dataset for fine-tuning various learned parameters of the answer selection system.

To illustrate, in some embodiments, the answer selection system can implement a gated self-attention mechanism for generating output based on contextual information and a unique combinations of candidate answers and the query. In this manner, the gated self-attention mechanism can, for each candidate answer, generate an output (e.g., a gate vector) that is dependent on both a context vector associated with the contextual information and one or more inputs making up a combination of a candidate answer and the query. Using the generated output from the gated self-attention mechanism, the answer selection system can update memory cell values of the memory network model architecture in addition to updating controlling context values for predicting a matching probability that a candidate answer is an answer to the query.

As just mentioned, in some embodiments, the answer selection system can utilize a gated self-attention mechanism to capture the relationships between contextual information, a query, and candidate answers. In particular, the gated-self attention mechanism can determine a gated-self attention output vector representing associations between a context vector and an input vector (e.g., a vector representation of a query combined with a candidate answer). To illustrate, the gated-self attention mechanism can use one or more functions with learned parameters to determine, based on the above inputs, self-attention outputs of the gated self-attention output vector. Additionally, in some embodiments, the answer selection system can transform (e.g., to break attention symmetry) and/or normalize self-attention outputs of the gated self-attention output vector. In turn, the answer selection system can provide the gated-self attention output vector to various components of the answer selection system (e.g., for generating cell state updates and/or additional context vector states described further below).

As also mentioned, the answer selection system can utilize a memory network for refining system outputs or predictions over multiple steps. For example, over multiple reasoning hops, the answer selection system can use a context vector in addition to the gated-self attention mechanism to interpret input vectors. In this manner, memory cell updates from hop-to-hop can include a memory cell value modified by the gated self-attention output vector mentioned above and described in detail further below. Based on the memory cell updates, the answer selection system can also generate a next state of the context vector, which in turn, the answer selection system can use for determining a matching probability for the query and a given candidate answer.

As further mentioned above, the answer selection system can employ a transfer learning process. In particular, the answer selection system can initially train using a large-scale corpus to obtain broad coverage of questions and answers, including negative examples, for a variety of fields and topics. Once initially trained, the answer selection system can then fine-tune the learned parameters on a target dataset of interest (e.g., an online product catalogue, a company website, etc.).

As briefly mentioned above, a number of problems exists with conventional systems, particularly in relation to prediction accuracy and flexibility. For example, some conventional systems separately encode query-candidate pairs. In so doing, both a query embedding and the candidate answer embedding can fail to include information regarding the other embedding. By separately encoding a query and a candidate answer, conventional systems can suffer from decreased prediction accuracy and flexibility.

In addition, some conventional systems focus analyses on a limited unit size (e.g., up to a few words at most). The use of a limited unit size can cause conventional systems to leave some terms, context, and various types of nuances unaccounted for during the analysis. By suing a limited unit size, such conventional system can produce adversely affected predictions.

Further, some conventional systems use attention mechanisms that compute an association score between two vectors as a scalar value (e.g., a normalized dot product of two vectors). However, a self-attention output of a scalar value is often insufficient to properly control the flow of information in answer selection applications. As such, conventional system that compute an association score between two vectors as a scalar value can have decreased accuracy and fail to adjust to longer inputs.

The answer selection system described herein can provide several advantages over conventional systems. As one example, the answer selection system can improve prediction accuracy of a candidate answer match with a query. In particular, by generating (and modeling on) a combined encoding that includes a representation of both the query and a given candidate answer, the answer selection system can utilize more information for enhanced resolution of similarity and improved quality of query-candidate answer matches. In addition, the answer selection system can improve prediction accuracy and flexibility by incorporating greater portions of a query (e.g., up to an entirety of the query). For example, the answer selection system can use larger unit sizes up to whole sentences, paragraphs, columns, cells, pages, slides, etc. Thus, by accounting for greater portions of a query, the answer selection system can decrease an amount of limitations with respect to the number of words in query. Additionally, the answer selection system can decrease an amount of error introduced from query loss and/or an erroneous selection of representative query words. Such error and limitation decreases can thereby positively impact flexibility and accuracy of the answer selection system. In addition, the answer selection system can utilize a vector gate as an output of the gated self-attention mechanism to control the flow of information as opposed to a scalar value. By using a gate vector with adaptable representation based on element-wise modification from various functions (e.g., sigmoid functions, parametrized functions, etc.), the answer selection system can be more flexible in modeling interactions between vectors such as a context vector and an input vector.

As illustrated by the foregoing discussion, the present disclosure utilizes a variety of terms to describe features and benefits of the answer selection system. Additional detail is now provided regarding the meaning of these terms. For example, as used herein, the term "query" refers to textual data. In particular, the query can include words, metadata, speech recognition data, and/or transcribed audio data that are the subject of interest in matching to a candidate answer. For instance, the query can include a sequence of words (either written or spoken). For example, a query can include one or more words that form one or more sentences in the form of statements and/or questions. A query can also, or alternatively, refer to one or more words that do not form a sentence, but instead form a sentence fragment, a description of a particular object, and/or a partial question. Indeed, a query can refer to one or more words combined in a sequential nature.

Further, as used herein, the term "candidate answer" refers to a set of textual data. In particular, the candidate answer can include a set of textual data possibly associated with the query defined above. For example, like the query, the candidate answer may include any suitable set and/or size of textual data (e.g., words, metadata, speech recognition data, transcribed audio data, etc.) that is possibly associated or matched to the query according to some degree or percentage of similarity/relevance. Relatedly, the term "answer" refers to one of the candidate answers defined above. For example, the answer can be one of the candidate answers that the answer selection system determines is a best match to the query also defined above. Similar to a query, a candidate answer can include a sequence of words (either written or spoken). For example, a candidate answer can include one or more words that form one or more sentences in the form of statements and/or answers to questions. A candidate answer can also, or alternatively, refer to one or more words that do not form a sentence, but instead form a sentence fragment, a description of a particular object, and/or a partial answer to a question. Indeed, a candidate answer can refer to one or more words combined in a sequential nature.

Further, as used herein, the term "input vector" refers to an expression or representation of words, sentences, phrases, or paragraphs in a vector space. Particularly, a vector representation of a query can refer to a representation in vector space that indicates information associated with the query. In particular, the input vector can include a vector representation of a combination of both a query and a candidate answer. Relatedly, the term "sequence of input vectors" referred to in this disclosure includes a grouping of input vectors. For example, a sequence of input vectors can include a first input vector corresponding to the combination of a candidate answer and a first sentence in a query paragraph, a second input vector corresponding to the combination of the candidate answer and a second sentence in the query paragraph, a third input vector corresponding to the combination of the candidate answer and a third sentence in the query paragraph, and so forth.

Additionally, as used herein, the term "contextual information" refers to information associated with dialogue context. In particular, contextual information can refer to context specific to a query. For example, contextual information can include a previous utterance in a dialogue history, previous/subsequent textual sequences adjacent to the query, discourse information related to a dialogue, or a question posed to the answer selection system. Further, the answer selection system can represent the contextual information in a context vector. As used herein, the term "context vector" refers to a feature vector including representations of information regarding features or attributes for the contextual information described above.

As mentioned, the answer selection system can utilize a neural network to generate or determine answers to queries. As used herein, the term "neural network" refers to an artificial machine-learning model that learns tasks by analyzing example data utilizing a plurality of layers that analyze features of the example data at different levels of abstraction. In particular, the term neural network can include a model of interconnected digital neurons that communicate and learn to approximate complex functions and generate outputs based on a plurality of inputs provided to the model. A neural network can include a variety of deep learning models, including convolutional neural networks, recurrent neural networks (e.g., with long short-term memory architecture), deep neural networks, or deep stacking networks. Neural networks such as recurrent neural networks can model complex non-linear relationships by generating hidden vector outputs along a sequence of inputs. To illustrate, in one or more embodiments the answer selection system utilizes new architectures of neural networks referred to as a gated-self attention mechanism or "GSAM." For example, the gated-self attention mechanism or GSAM can be trained to control access to memory, allowing certain features to be stored and later accessed while processing neural network inputs in order to learn the context of a given input (e.g., a given hidden state corresponding to the input) without relying solely on that input. In one or more embodiments, the gated-self attention mechanism corresponds to a particular neural network layer(s) and generates the gated self-attention output vectors with consideration of contextual information, a query, and a candidate answer. In more detail, the term "gated self-attention output vector" refers to the one or more values generated by the gated-self attention mechanism as used by a neural network. In particular, the gated self-attention output vector can include values of a matrix or vector that combines values of a context vector and an input vector.

Further, as used herein, the term "memory network" refers to a type of artificial memory network. In particular, the memory network can include architecture to store hop-specific (i.e., layer specific) information like contextual information or various outputs like gated self-attention output vectors. For example, the memory network can include a recurrent neural network, long-short term memory, a neural stack, a neural Turing machine, neural random access memory, and/or any other suitable type of neural memory. In some embodiments, information of the memory network can be stored in a memory block/unit or a set of memory blocks/units, which is referred to herein as a "cell state." Information in the cell state can be added to, removed, or otherwise updated from hop-to-hop, which therefore, enables the answer selection system to refine relationships between inputs from hop-to-hop in the memory network. In addition, the combination of the memory network and the gated-self attention mechanism defined above can be referred to in the present disclosure as a "gated self-attention memory network" or "GSAMN" model described in more detail in conjunction with FIGS. 3A-3B.

Further, as referred to herein, the term "matching probability" refers to a statistical likelihood. In particular, the matching probability can include a probability that a candidate answer corresponds to a query. For example, the answer selection system may pass one or more outputs of the GSAM/GSAMN to a probability function to determine a probability distribution of candidate answers in numerical, graphical, or other suitable form corresponding to a degree of similarity and/or relevance to a query.

As mentioned, the answer selection system generates matching probabilities for combinations of respective candidate answers and the query. As used herein, the term "utterance" refers to a sequence of words. Particularly, an utterance can refer to one or more words spoken by a user, including the query and/or contextual information. For example, an utterance can include one or more words that form one or more sentences in the form of statements and/or questions. An utterance can also, or alternatively, refer to one or more words that do not form a sentence, but instead form a sentence fragment, a description of a particular object, and/or a reply to a question. Indeed, an utterance can refer to one or more words combined in a sequential nature.

As further used herein, the term "word-vector representation model" refers to a word embedding layer in a machine-learning model. In particular, the word-vector representation model can convert textual data to a vector representation called an "embedding" (e.g., a query embedding of a query, a candidate answer embedding of a candidate answer, etc.). Examples of word-vector representation models can include word2vec (as described in Tomas Mikolov, Ilya Sutskever, Kai Chen, Greg Corrado, and Jeffrey Dean, *Distributed representations of words and phrases and their compositionality*, In Proceedings of the 26th International Conference on Neural Information Processing Systems—Volume 2, NIPS'13, 2013, pages 3111-3119, USA. Curran Associates Inc., hereby incorporated by reference in its entirety) or GloVe (as described in Jeffrey Pennington, Richard Socher, and Christopher, D. Manning, *Glove: Global vectors for word representation*, In EMNLP, 2014, hereby incorporated by reference in its entirety). As used herein, the term "natural language representation model" or "NLPM" refers to an enhanced word-vector representation model such as ELMo (as described in Matthew E. Peters, Mark Neumann, Mohit Iyyer, Matt Gardner, Christopher Clark, Kenton Lee, and Luke S. Zettlemoyer. *Deep contextualized word representations*, In NAACL-HLT, 2018, hereby incorporated by reference in its entirety) or BERT (as described in Jacob Devlin, Ming-Wei Chang, Kenton Lee, and Kristina Toutanova, Bert: *Pre-training of deep bidirectional transformers for language understanding*, CoRR, abs/1810.04805, 2018, hereby incorporated by reference in its entirety), etc.

In addition, as used herein, the term "question-answer dataset" refers to a corpus of questions and answers. In particular, the question-answer dataset refers to a body of questions and answers that the answer selection system uses to initially train and learn parameters. Examples of question-answer datasets can include Yahoo Answers, Stack Exchange, TrecQA, WikiQA, and/or any other suitable community question-answer platform. Relatedly, the term "target dataset" refers to a set of data of interest. For example, the answer selection system can refine one or more learned parameters (e.g., learned via the question-answer dataset) by applying the one or more learned parameters at the target dataset. In some embodiments, the target dataset can include one or more candidate answers to a query, while in other embodiments, arbitrary and/or unrelated to the query.

Further, as used herein, the term "state" refers to a condition of a machine-learning model (or any portion thereof) at a given point in time or position. In particular, the state can refer to the reasoning-hop or layer of the GSAMN (e.g., a current cell state of the memory network, a next cell state of the memory network, etc.). In addition, the term "state" used as an adjective or other descriptive term can reference a corresponding condition of the model at a given point in time or position. For example, a next context vector state can represent the values of the context vector in the next state of the GSAMN (e.g., the $k+1^{th}$ reasoning hop). Similarly, a current gated self-attention output vector can represent the values of the gated self-attention output vector in the current state of the GSAMN (e.g., the $k^{th}$ reasoning hop).

In some embodiments, the answer selection system trains one or more neural networks to generate a predicted match between a candidate answer and a query. As used herein, the term "train" refers to utilizing information to tune or teach a neural network or other model. The term "training" (used as an adjective or descriptor, such as "training dataset") refers to information or data utilized to tune or teach the model.

Additional detail regarding the answer selection system will now be provided with reference to the figures. For example, FIG. 1 illustrates a schematic diagram of an example system 100 including an answer selection system 106 in accordance with one or more embodiments. An overview of the answer selection system 106 is described in relation to FIG. 1. Thereafter, a more detailed description of the components and processes of the answer selection system 106 is provided in relation to the subsequent figures.

As shown in FIG. 1, the system 100 includes server(s) 102, a client device 108, a third-party server 112, and a network 114. Each of the components of the system 100 can communicate via the network 114, and the network 114 may be any suitable network over which computing devices can communicate. Example networks are discussed in more detail below in relation to FIG. 8.

As mentioned, the system 100 can include the client device 108. The client device 108 can be one of a variety of computing devices, including a smartphone, tablet, smart television, desktop computer, laptop computer, virtual reality device, augmented reality device, or other computing device as described in relation to FIG. 8. Although FIG. 1 illustrates a single client device 108, in some embodiments the system 100 can include multiple different user client devices, each associated with a different user. The client device 108 can be capable of recording and/or transmitting utterances (e.g., in the form of digital audio) to the server(s) 102. Thus, the answer selection system 106 can receive utterances (e.g., a query and/or contextual information) from more than one user. Additionally, the client device 108 can be capable of displaying and/or audibly playing or otherwise reproducing an answer to the query received from the server(s) 102 for presentation to a user.

As illustrated in FIG. 1, the system 100 includes the server(s) 102. The server(s) 102 may generate, store, receive, and transmit electronic data, such as digital text, digital video, digital images, digital audio, metadata, etc. For example, the server(s) 102 may receive data from the client device 108 in the form of an utterance (e.g., digital audio). In addition, the server(s) 102 can transmit data to the client device 108 to provide an answer to a query. For example, the server(s) 102 can communicate with the client device 108 to transmit and/or receive data via the network 114. In some embodiments, the server(s) 102 comprises a content server. The server(s) 102 can also comprise an application server, a communication server, a web-hosting server, a social networking server, a digital content campaign server, etc.

As shown in FIG. 1, the server(s) 102 can also include the answer selection system 106 as part of a digital content management system 104. The digital content management system 104 can communicate with the client device 108 to provide digital content such as digital text, digital audio, digital video, digital images, or some other type of information. Indeed, the digital content management system 104 can refer to a digital agent system, digital content campaign system (e.g., a system for selecting and providing customized digital videos to client devices simultaneously accessing websites or other digital assets) and/or a system for facilitating dialogue between the answer selection system 106 and one or more users.

Although FIG. 1 depicts the answer selection system 106 located on the server(s) 102, in some embodiments, the answer selection system 106 may be implemented by (e.g., located entirely or in part) on one or more other components of the system 100. For example, the answer selection system 106 may be implemented by the client device 108, the third-party server 112, and/or a third-party device.

Indeed, in or more embodiments, the answer selection system 106 can be implemented on the third-party server 112. For example, in such embodiments, the server(s) 102 may be associated with a business such as a restaurant chain, a department store, a digital content publisher, etc., and the third-party server 112 can host the answer selection system 106. Specifically, the third-party server 112 can receive information regarding a user, provide identification information for the user from the third-party server 112 to the digital content publisher by way of the server(s) 102, and the server(s) 102 can select and provide digital content for display to a client device (e.g., the client device 108) of a user. Additionally or alternatively, a same or different third-party server 112 can communicate with the server(s) 102 and/or the client device 108 to provide third-party data. For instance, the third-party server 112 can host a word-vector representation model for generating embeddings for contextual information, a query, and/or candidate answers.

As further illustrated in FIG. 1, the client device 108 includes a client application 110. The client application 110 may be a web application or a native application installed on the client device 108 (e.g., a mobile application, a desktop application, etc.). The client application 110 can interface with the answer selection system 106 to receive digital content such as digital text, digital audio, and/or digital video from the server(s) 102, and to present (e.g., display) the digital content received from the server(s) 102. In addition, the client application 110 can collect and provide information associated with a user to the answer selection system 106. For instance, the client application 110 can provide information relating to utterances received from a user. Thus, the answer selection system 106 can provide an answer to a query from a user.

In some embodiments, though not illustrated in FIG. 1, the system 100 may have a different arrangement of components and/or may have a different number or set of components altogether. For example, the client device 108 may communicate directly with the answer selection system 106, bypassing the network 114. Additionally, the answer selection system 106 can include one or more databases (e.g., a digital content database) housed on the server(s) 102 or elsewhere in the environment 100. Further, the answer selection system 106 can include one or more machine-learning models (e.g., neural networks). The answer selection system 106 can be implemented in a variety of different ways across the server(s) 102, the network 114, the third-party server 112, and/or the client device 108.

Figure 2:
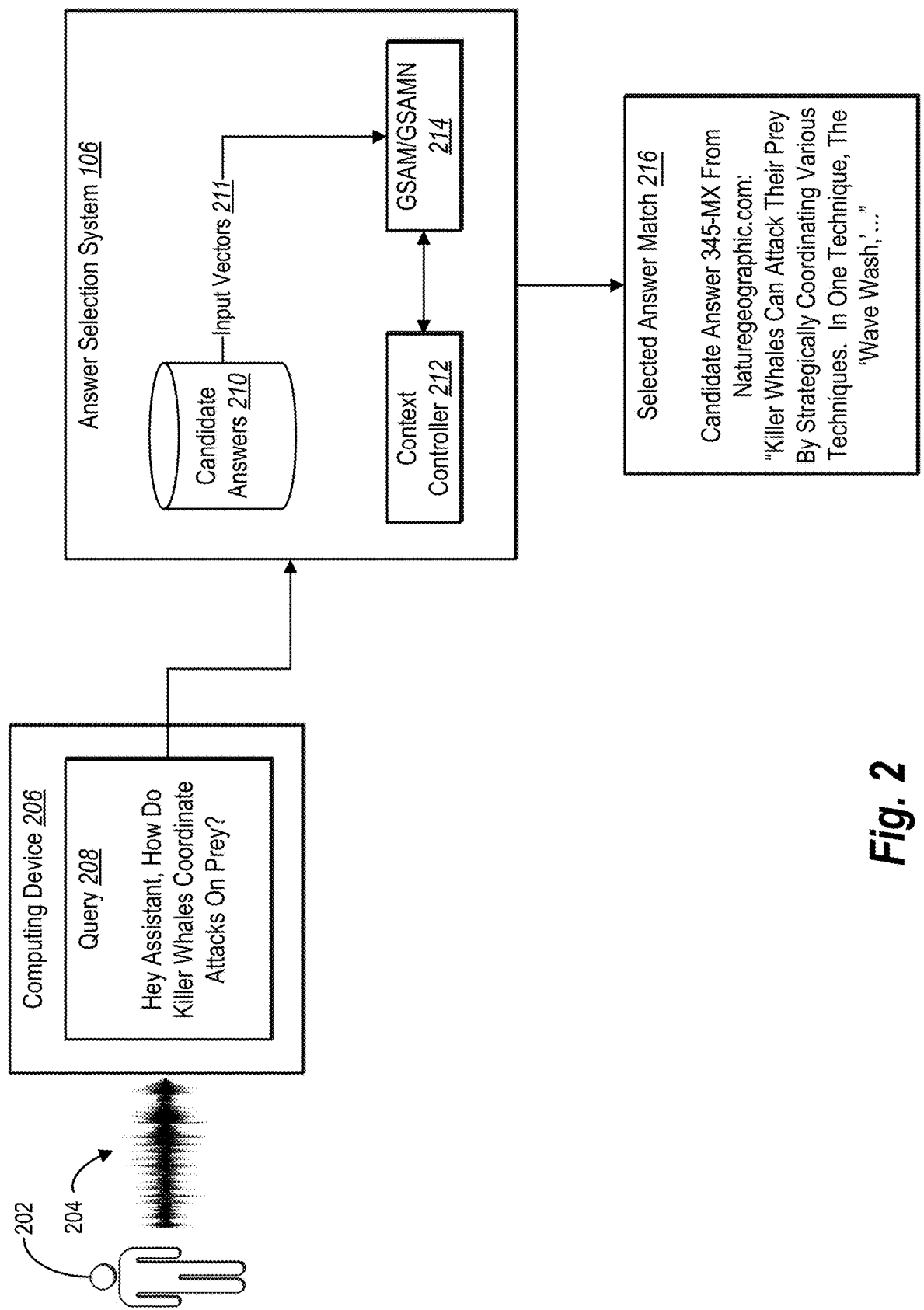
FIG. 2 illustrates a schematic diagram of a process of determining a selected answer match to a query in accordance with one or more embodiments.

As mentioned above, the answer selection system 106 can provide an answer to a query. FIG. 2 illustrates a schematic diagram by which the answer selection system 106 determines a selected answer match 216 based on a query 208 in accordance with one or more embodiments of the present disclosure. As shown, FIG. 2 includes a user 202, audio data 204, a computing device 206, the query 208, the answer selection system 106, and the selected answer match 216. Each is discussed in turn.

The user 202 can provide the audio data 204 to the computing device 206. In these or other embodiments, the audio data 204 can be representative of one or more utterances, including the query 208 as dictated by the user 202. Additionally or alternatively, the audio data 204 can include one or more other utterances, including contextual information. For example, the contextual information can, in this example embodiment, include a previous query to the virtual assistant regarding how orcas communicate with each other.

In turn, based on the audio data 204, the answer selection system 106 can cause the computing device 206 to convert the audio data 204 to textual data. Further illustrated, the answer selection system 106 may cause the computing device 206 to display the query 208 in a graphical user interface (e.g., via the client application 110). In these or other embodiments, the computing device 206 can be the same as or similar to the client device 108 described above in conjunction with FIG. 1. In addition, the computing device 206 can send the query 208 and contextual information (if available) to the answer selection system 106.

At the answer selection system 106, one or more components can pre-process the query 208 and any contextual information (e.g., for conversion to an embedding via a word-vector representation model). Once the query 208 is in vector form (e.g., a single vector for a smaller query 208 or a sequence of sub-vectors for a larger query 208), the answer selection system 106 can combine the query 208 with one or more of the candidate answers 210 (also converted to vector form) to form an input vector 211 representing both the query 208 and a given candidate answer of the candidate answers 210. As mentioned, for larger queries 208 (e.g., a paragraph, column, page, etc.), the input vector 211 may include a sequence of input sub-vectors. In such a case, the answer selection system 106 can combine a single given candidate answer embedding with each input sub-vector query embedding of the larger-size query 208 to generate input vectors 211. In so doing, the answer selection system 106 can account for greater portions of a query and/or accept larger queries, thereby decreasing an amount of error introduced from query loss and/or erroneous selection of representative query words. Further, the answer selection system 106 can also reduce or otherwise eliminate word-count/data size restrictions for a query by utilizing, where applicable or needed, multiple input sub-vectors instead of a single input vector.

In addition, the answer selection system 106 can generate multiple unique input vectors by combining the query 208 with respective candidate answers of the candidate answers 210. By generating (and subsequently modeling on) multiple input vectors 211 that each includes a representation of both the query 208 and a respective candidate answer of the candidate answers 210, the answer selection system 106 can utilize more information for enhanced resolution of similarity and improved quality of query-candidate answer matches.

As further illustrated, the answer selection system 106 can feed the input vectors 211 to a gated self-attention mechanism (GSAM) or a gated self-attention memory network (GSAMN), which is denoted as GSAM/GSAMN 214 in FIG. 2, to generate one or more gated self-attention output vectors. More specifically, the GSAM/GSAMN 214 can generate the gated self-attention output vectors based on the input vectors 211 and one or more context vectors provided from a context controller 212. Then, utilizing the gated self-attention output vector(s), the GSAM/GSAMN 214 can update the cell state of a memory network if included within the GSAM/GSAMN 214. That is, the answer selection system 106 can utilize the gated self-attention output vectors to help control the flow of information within the answer selection system 106 (e.g., to remember important and/or relevant information, forget unimportant and/or irrelevant information, etc. by updating, as applicable, the cell state of the memory network in the GSAM/GSAMN 214).

As further illustrated by the bi-directional arrow between the GSAM/GSAMN 214 and the context controller 212, the GSAM/GSAMN 214 can pass the gated self-attention output vector(s) and/or updated memory cell values to the context controller 212. The context controller 212 can handle the contextual information received via the audio data 204 discussed above. In particular, the context controller 212 can handle an embedding of the contextual information (generated via a word-vector representation model). By accounting for the contextual information, the answer selection system 106 can more accurately determine a selected answer match 216 that is more responsive to the query 208. Furthermore, in addition to passing the context vector to the GSAM/GSAMN 214 for generating the gated self-attention output vector(s), the context controller 212 can also update values of the context vector (i.e., generate a next context vector state). Specifically, using the gated self-attention output vector(s) and/or the updated memory cell values passed from the GSAM/GSAMN 214, the context controller 212 can generate a next context vector state by combining a current context vector state with the gated self-attention output vector(s) and/or updated memory cell values.

In turn, the answer selection system 106 can use the next context vector state as an intelligent blending of contextual information, the query 208, and a given candidate answer of the candidate answers 210 for determining a matching probability between the given candidate answer and the query 208. For example, the answer selection system 106 can pass the next context vector state to a probability function for determining a probability that the given candidate answer is a match to the query 208. Still further, the answer selection system 106 can perform the foregoing acts in series and/or in parallel for each of the input vectors 211

(i.e., for each combination of the query and respective candidate answer) such that the answer selection system 106 can select the best query-candidate answer match. For example, as shown, the answer selection system 106 can return the selected answer match 216 that corresponds to a candidate answer 345-MX of the candidate answers 210, in which the example website nationalgeographic.com includes a best match response to the query 208 out of the candidate answers 210.

In other embodiments, one or both of the query 208 and contextual information can be in textual format from the outset such that the audio data 204 is not required. For example, the user 202 may choose to type the query 208 into the computing device 206 instead of voicing the query 208. Other suitable arrangements in addition to or alternative to FIG. 2 are herein contemplated.

Figure 3A:
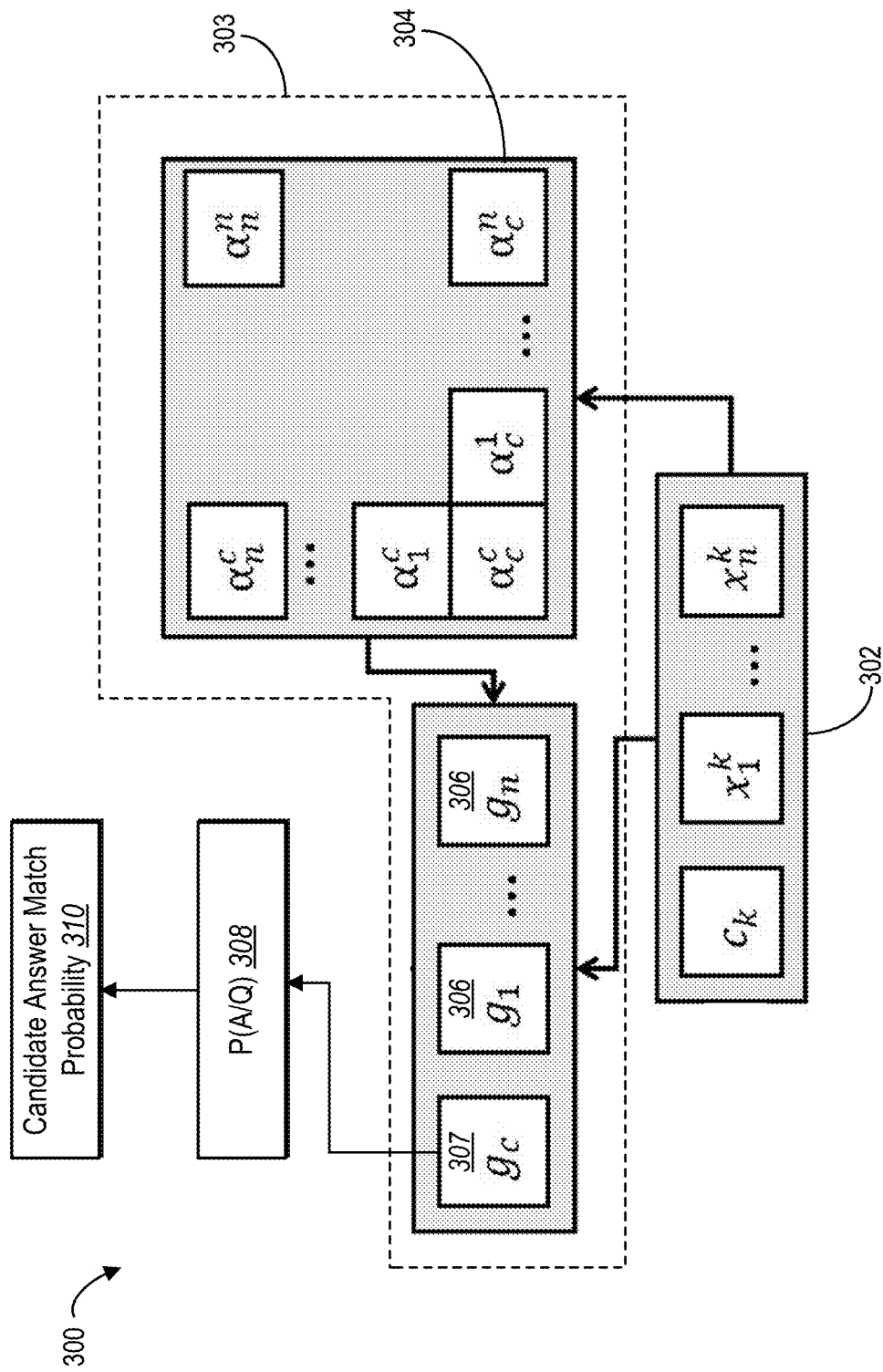
FIGS. 3A-3B illustrate example process flows for using a gated-self attention mechanism and a gated self-attention memory network, respectively, to determine a candidate answer match probability in accordance with one or more embodiments.

As mentioned above, the answer selection system 106 can use a gated self-attention mechanism to generate gated self-attention output vectors in determining match probabilities for candidate answers. FIG. 3A illustrates a process flow 300 for using a gated self-attention mechanism 303 to determine a gated self-attention output vector 306 for determining a candidate answer match probability 310, in accordance with one or more embodiments of the present disclosure. As shown, the process flow 300 includes inputs 302, the gated self-attention mechanism 303, a probability function 308, and the candidate answer match probability 310. Each is discussed in turn.

As mentioned, the process flow 300 includes the inputs 302 at step k. The inputs 302 as shown in FIG. 3A include an input vector denoted as $x_1^k \ldots x_n^k$ that can each include a combination of a query (or a portion thereof) and a candidate answer as described above in conjunction with FIG. 2. Though not illustrated for simplicity of illustration, the inputs 302 can further include additional input vectors (e.g., input sub-vectors for a larger query and/or one or more additional input vectors for each combination of the query and a respective candidate answer). In addition, the inputs 302 as shown in FIG. 3A includes a context vector denoted as $c_k$ as also described above. With the context vector and the input vector of the inputs 302, the answer selection system 106 can feed the inputs 302 to the gated self-attention mechanism 303 for attention to the query, a given candidate answer, and contextual information. In so doing, as opposed to utilizing the context vector or a single input vector alone, the answer selection system 106 can improve accuracy and flexibility for determining the candidate answer match probability 310.

As shown, a gated self-attention matrix 304 with its associated values is depicted in matrix form (albeit other forms are herein contemplated). To generate or otherwise populate the values of the gated self-attention matrix 304, the gated self-attention mechanism 303 receives the inputs 302 and can execute one or more of the following example algorithms:

$$v^j = Wx_j + b; \quad v^c = Wc + b$$

$$s_i^j = x_i^T v^j; \quad s_i^c = x_i^T v^c$$

$$\alpha_i^j = \frac{\exp(s_i^j)}{\sum_{k \in [1 \ldots n]} \exp(s_i^k) + \exp(s_i^c)}$$

$$\alpha_i^c = \frac{\exp(s_i^c)}{\sum_{k \in [1 \ldots n]} \exp(s_i^k) + \exp(s_i^c)},$$

where W and b represent learned parameters shared among functions $f_1 \ldots f_n$; vectors $v^j$ and $v^c$ represent linear transformed inputs that the gated self-attention mechanism 303 uses to determine values of the self-attention matrix 304; $s_i^j$ represents the unnormalized attention score of input $x_j$ put on $x_i$, and $a_i^j$ represents the normalized attention score of the same; and $s_i^c$ represents the unnormalized attention score of context vector input c put on $x_i$, and $a_i^c$ represents the normalized attention score of the same. In addition, by using affine-transformed inputs (as opposed to the unmodified values of $x_1^k \ldots x_n^k$) to calculate the values of the self-attention matrix 304, the answer selection system 106 can break the attention symmetry phenomenon that can otherwise adversely affect determining the candidate answer match probability 310.

With the values of the self-attention matrix 304 populated, the answer selection system 106 can proceed to generating a gated self-attention output vector 306 denoted in FIG. 3A as $g_1 \ldots g_n$ using the following example algorithm:

$$g_i = f_i(c, X) = \sigma\left(\sum_j (\alpha_i^j x^j) + \alpha_i^c c\right),$$

where $\sigma$ denotes the element-wise sigmoid function; $f_i$ represents a parameterized function; and X represents one or more input vectors. Thus, according to the above expression for generating the gated self-attention output vector 306, the answer selection system 106 can aggregate an input vector and the context vector both weighted by various self-attention outputs a, which can include values depicted in the gated self-attention matrix 304 of FIG. 3A.

In turn, the answer selection system 106 can apply the inputs 302 to the gated self-attention output vector 306 to generate a current gated self-attention output vector state 307 denoted as $g_c$ in FIG. 3A, which in shorthand notation can be represented as:

$$g_c = f_c(c_k, X)$$

The answer selection system 106 can then pass the current gated self-attention output vector state 307 to the probability function 308 for determining the candidate answer match probability 310 that includes a matching probability between the query and the respective candidate answer. Examples of the probability function 308 can include a softmax function or some other normalizing function to create a probability based on a vector. In these or other embodiments, the probability function 308 can be represented via the following example expression:

$$P(A|Q) = \sigma(W_c c_T + b_c),$$

where $W_c$ and $b_c$ represent learnable parameters, and $c_T$ represents a final context vector state of the context vector.

Still further, the answer selection system 106 can perform the foregoing acts in series and/or in parallel for each input vector in a sequence of input vectors (e.g., for a larger query comprising multiple sentences, paragraphs, pages) and/or for multiple input vectors (e.g., for each combination of the query and respective candidate answer) such that the answer selection system 106 can select the best query-candidate answer match. Thus, as shown and described with respect to FIG. 3A, the answer selection system 106 can utilize a gated self-attention mechanism 303 to account for each of the query, the contextual information, and a set of candidate answers while also accurately and flexibly controlling the flow of information used to generate the candidate answer match probability 310 and ultimately provide a response to the query.

Figure 3B:
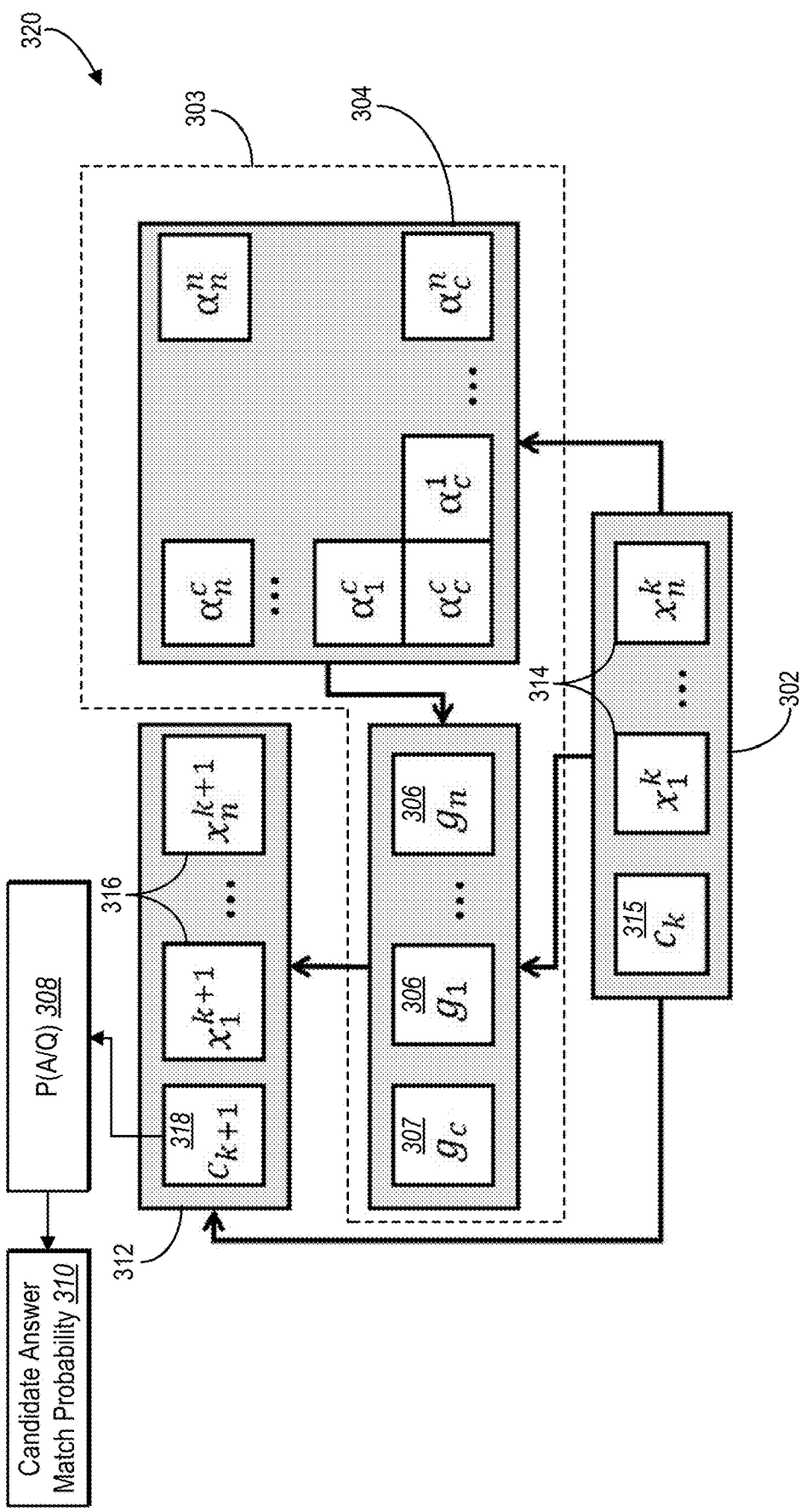

As mentioned above, the answer selection system 106 can use a gated-self attention memory network (GSAMN) that combines a memory network and the gated self-attention mechanism (i.e., the GSAM described above in relation to FIG. 3A) to generate gated self-attention output vectors in determining match probabilities for candidate answers. Similar to FIG. 3A, FIG. 3B illustrates a process flow 320 for using the gated-self attention mechanism 303 to determine a gated self-attention output vector 306 for determining a candidate answer match probability 310, in accordance with one or more embodiments of the present disclosure. Aspects of FIG. 3A included in FIG. 3B are not repeated for brevity. However, as shown in FIG. 3B, the process flow 320 adds, relative to the process flow 300 of FIG. 3A, next inputs 312 in which an input vector 314 (denoted as $x_1^k \ldots x_n^k$) of the inputs 302 and an input vector 316 (denoted as $x_1^{k+1} \ldots x_n^{k+1}$) of the next inputs 312 are cell states stored in a memory network. By utilizing the memory network in tandem with gate features of the gated self-attention output vector 306, the answer selection system 106 can remember important and/or relevant information, forget unimportant and/or irrelevant information, etc. by updating the cell state of the memory network. In turn, the updated cell state of the memory network can influence a next context vector state 318 (denoted as $c_{k+1}$) relative to a current context vector state 315 (denoted as $c_k$), for example, to more accurately represent a query, a candidate answer, and contextual information for generating the candidate answer match probability 310.

In further detail, the answer selection system 106 can update the cell state of the memory network (i.e., generate the input vector 316) using one or more of the following algorithms:

$$g_i = f_i(c_k, X)$$

$$x_i^{k+1} = g_i \odot x_i^k,$$

where $g_i$ represents the gated self-attention output vector 306; $f_i$ represents a parameterized function; $c_k$ represents the current context vector state 315; X represents one or more input vectors (e.g., the input vector 314); $x_i^{k+1}$ represents the input vector 316 as the next cell state of the memory network at the k+1 reasoning hop; and $x_i^k$ represents the input vector 314 as the current cell state of the memory network at the kth reasoning hop.

Based on the cell state update, the answer selection system 106 can determine the next context vector state 318 according to the following example algorithm:

$$c_{k+1} = g_c \odot c_k + \frac{1}{n}\sum_i x_i^{k+1}$$

Thus, as shown in the foregoing algorithm, the answer selection system 106 can determine the next context vector state 318 based on the current gated self-attention output vector state 307 of the GSAM, the current context vector state 315, and the input vector 316 (i.e., the next cell state of the memory network in this case). In particular, the answer selection system 106 can combine an average value of the next cell state (the input vector 316) with a dot product of the current gated self-attention output vector state 307 and the current context vector state 315. The answer selection system 106 can then pass the next context vector state 318 to the probability function 308 for determining the candidate answer match probability 310 that includes a matching probability between the query and the respective candidate answer as described above in conjunction with FIG. 3A.

Figure 4:
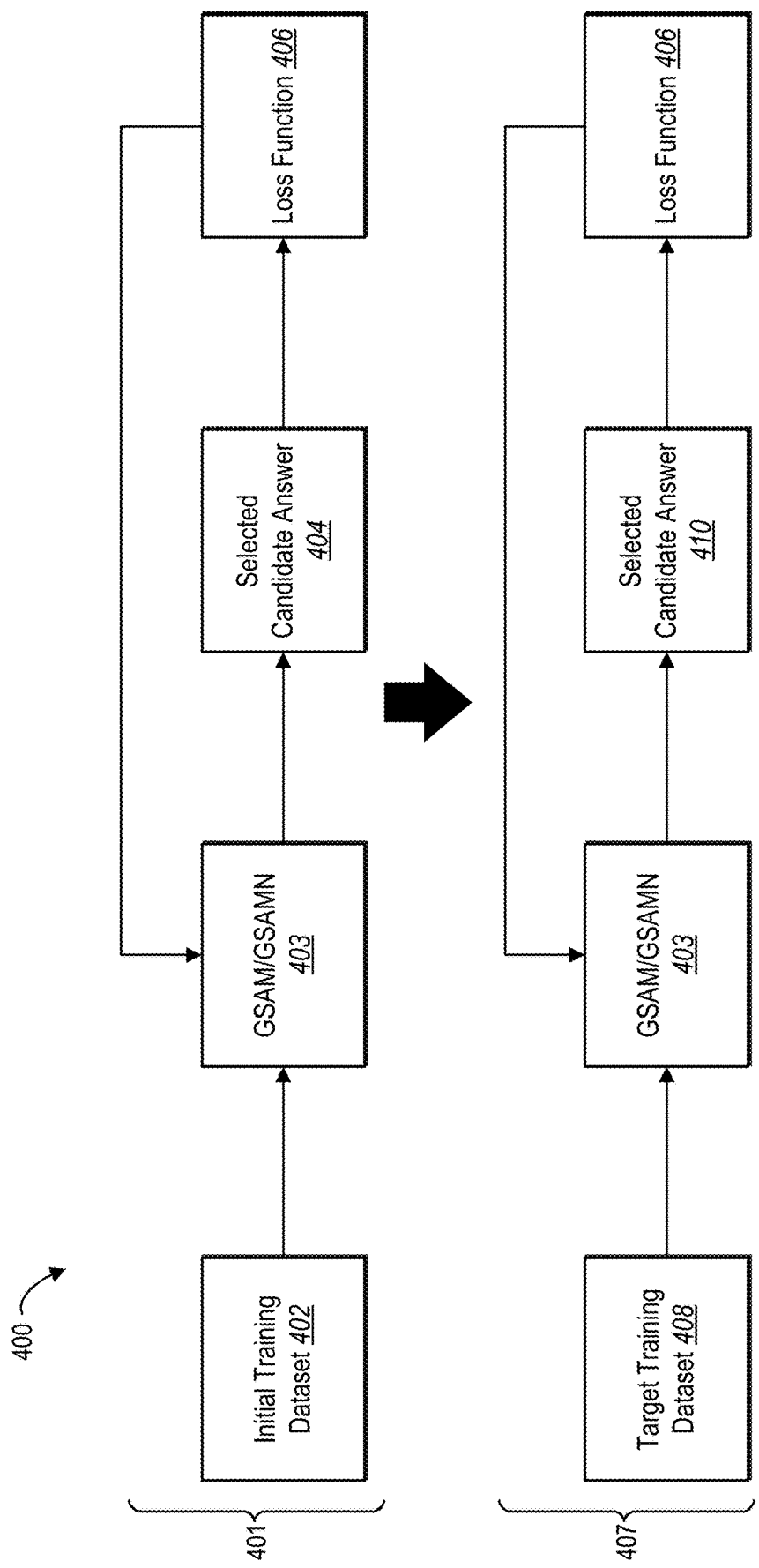
FIG. 4 illustrates an example process flow for training and tuning a gated-self attention mechanism and/or a gated self-attention memory network in accordance with one or more embodiments.

As mentioned above, the answer selection system 106 can transfer learning from a large scale corpus to a target dataset for fine-tuning various learned parameters. FIG. 4 illustrates an example process flow 400 for training and tuning a GSAM/GSAMN 403, in accordance with one or more embodiments of the present disclosure. In particular, FIG. 4 illustrates how the answer selection system 106 performs a two-phase learning/tuning process that provides a performance improvement to the answer selection system 106 over conventional methods (see FIG. 5 indicating that the models of the present disclosure implementing the "Transfer Learning" described below provide increased prediction accuracy of query-candidate answer matches).

As shown in FIG. 4, the process flow 400 includes a first phase 401 and a second phase 407. In the first phase 401, the answer selection system 106 trains the GSAM/GSAMN 403 on an initial training dataset 402. The initial training dataset 402 can include a question-answer dataset of a large scale corpus. In some embodiments, the initial training dataset 402 can be further added to or filtered. For example, the answer selection system 106 can remove query-answer pairs from the initial training dataset 402 that include text written in a language different than English. In another example, the answer selection system 106 can remove query-answer pairs that have less than a threshold number of up-votes from community users. Myriad other pre-processing techniques can be utilized to further refine the initial training dataset 402. By using the initial training dataset 402 to obtain broad coverage of questions and answers, including negative examples, for a variety of fields and topics, the answer selection system 106 can accurately learn parameters for selecting/predicting candidate answers that match a query.

As further shown in FIG. 4, the GSAM/GSAMN 403 can output a selected candidate answer 404 based on a query within the initial training dataset 402. Then, at a loss function 406, the answer selection system 106 can compare the selected candidate answer 404 to a ground truth (i.e., the answer in the initial training dataset 402 paired with the query). In these or other embodiments, the loss function 406 can include a regression loss function (e.g., a mean square error function, a quadratic loss function, an L2 loss function, a mean absolute error/L1 loss function, mean bias error, etc.). Additionally or alternatively, the loss function 406 can include a classification loss function (e.g., a hinge loss/multi-class SVM loss function, cross entropy loss/negative log likelihood function, etc.). Further, the loss function 406 can return quantifiable data regarding the difference between the selected candidate answer 404 and the ground truth. In particular, the loss function 406 can return such loss data to the GSAM/GSAMN 403 where the answer selection system 106 can adjust parameters to improve the quality of query-answer matches by narrowing the difference between selected candidate answers and the ground truth. In some embodiments, the loss function 406 can include an Adam optimizer for intelligently adjusting weights and various parameters at the GSAM/GSAMN 403. Moreover, the training/learning of the first phase 401 can be an iterative process (as shown by the return arrow between the loss function 406 and the GSAM/GSAMN 403) such that the answer selection system 106 can continually adjust parameters of the GSAM/GSAMN 403 over learning cycles.

After the answer selection system 106 has trained the GSAM/GSAMN 403 in the first phase 401, the answer selection system 106 can proceed to the second phase 407 and fine-tune the parameters previously learned in the first phase 401. Specifically, as shown in the second phase 407, the answer selection system 106 can fine-tune the parameters of the GSAM/GSAMN 403 based on a target training dataset 408. The target training dataset 408 can include a question-answer dataset of interest, which can be further added to and/or refined as described above for the initial training dataset 402. Then, as further shown, the GSAM/GSAMN 403 can output a selected candidate answer 410 based on a query within the target training dataset 408. Additionally, at the loss function 406, the answer selection system 106 can compare the selected candidate answer 410 to a ground truth (i.e., the answer in the target training dataset 408 paired with the query) to generate loss data. In particular, and as described above, the loss function 406 can return such loss data to the GSAM/GSAMN 403 where the answer selection system 106 can adjust parameters to improve the quality of query-answer matches by narrowing the difference between selected candidate answers and the ground truth. In some embodiments, the loss function 406 can include an Adam optimizer for intelligently adjusting weights and various parameters at the GSAM/GSAMN 403. Moreover, the training/learning of the second phase 407 can be an iterative process (as shown by the return arrow between the loss function 406 and the GSAM/GSAMN 403) such that the answer selection system 106 can continually adjust parameters of the GSAM/GSAMN 403 over tuning cycles.

FIG. 5 illustrates a table 500 reflecting experimental results regarding the effectiveness of the answer selection system 106 in accordance with the foregoing. As shown in FIG. 5, the table 500 is categorized by model 502, target datasets 504a and 504b, and performance metrics 506 and 508. In particular, the table 500 depicts significant improvements for various models 510 described in the present disclosure relative to conventional models 512.

In more detail, the models 510 were initially trained using the NLPM embeddings in combination with one or more of the GSAMN model (e.g., as described in relation to FIGS. 2-3B) and/or the transfer learning techniques (e.g., as described in relation to FIG. 4) of the present disclosure. Specifically, the "NLPM+GSAMN+Transfer" model (representing a triple combination of NLPM embeddings, the GSAMN model, and transfer learning as described in the present disclosure) includes a mean average precision (MAP) score 506 of 0.914 and 0.857 for the target datasets 504a and 504b respectively, and a mean reciprocal rank (MRR) score 508 of 0.957 and 0.872 for the respective target datasets 504a and 504b. Further, the "NLPM +Transformers+Transfer" model (representing a triple combination of NLPM embeddings, an additional machine-learning layer with an attention mechanism, and transfer learning as described in the present disclosure) includes a MAP score 506 of 0.895 and 0.831 for the target datasets 504a and 504b respectively, and an MRR score 508 of 0.939 and 0.848 for the respective target datasets 504a and 504b.

Still further, the "NLPM +GSAMN" model (representing a combination of NLPM embeddings and the GSAMN model as described in the present disclosure) includes a MAP score 506 of 0.906 and 0.821 for the target datasets 504a and 504b respectively, and an MRR score 508 of 0.949 and 0.832 for the respective target datasets 504a and 504b. In addition, the "NLPM+Transfer" model (representing a combination of NLPM embeddings and transfer learning as described in the present disclosure) includes a MAP score 506 of 0.902 and 0.832 for the target datasets 504a and 504b respectively, and an MRR score 508 of 0.949 and 0.849 for the respective target datasets 504a and 504b.

For consistency of experimentation, the data shown in the table 500 was obtained by setting the number of reasoning hops to be two; setting the Adam optimizer with a learning rate of 5e-5 with coefficients $\beta_1$=0.9, $\beta_2$=0.999, and L2 weight decay of 0.01; having the learning rate warmup over the first ten percent of the total number of training steps; providing linear decay of the learning rate; and performing hyper-parameter tuning on the target datasets 504a and 504b.

Thus, as shown in FIG. 5, the models 510 of the present disclosure outperform all other models, including the conventional and state of the art models 512. As a result, the acts and algorithms described in the present disclosure as performed by the answer selection system 106 provide improvements to the functioning of a computing device, which is evidenced in the example results depicted in FIG. 5. More specifically, by implementing one or both of the GSAMN model and transfer learning techniques described in the foregoing sections, the answer selection system can improve a matching accuracy between a selected candidate answer and a query compared to the conventional models 512.

Figure 6:
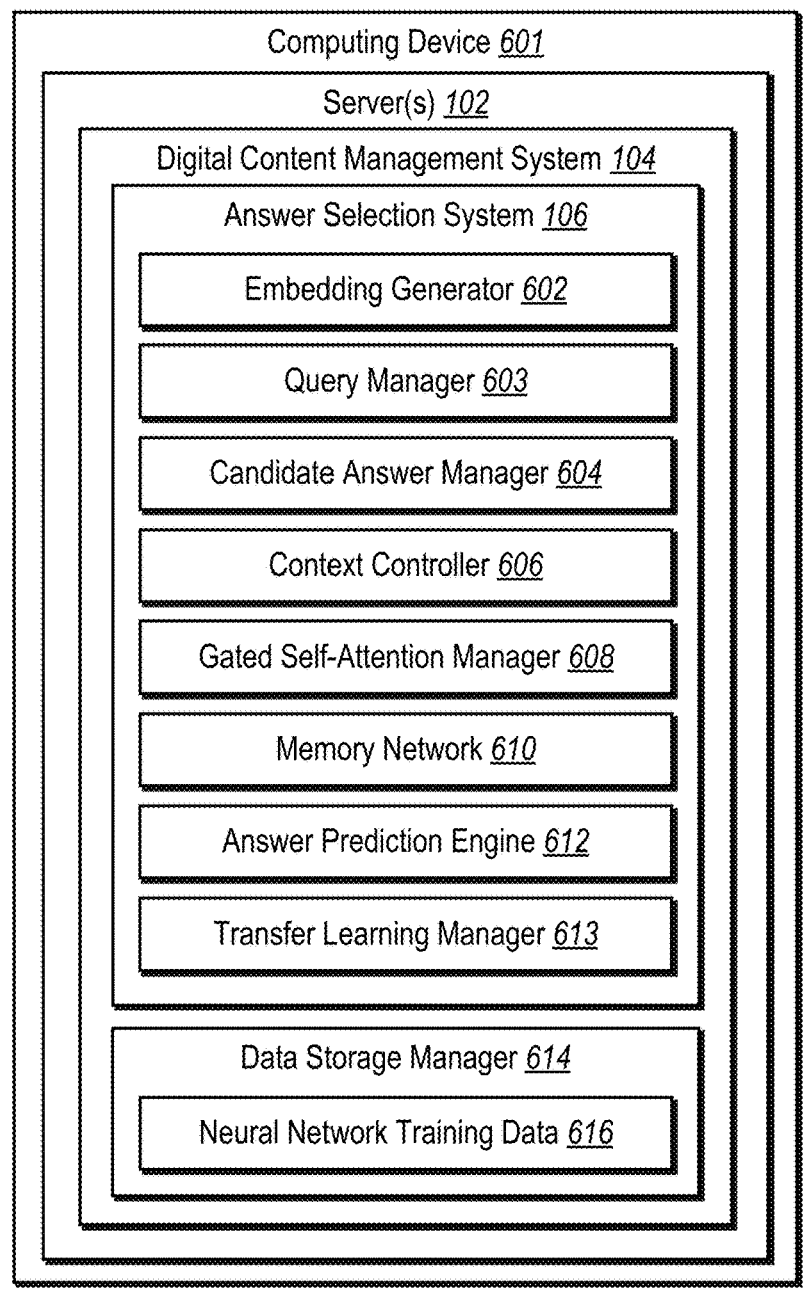
FIG. 6 illustrates an example schematic diagram of an answer selection system in accordance with one or more embodiments.

Turning to FIG. 6, additional detail will now be provided regarding various components and capabilities of the answer selection system 106. In particular, FIG. 6 illustrates an example schematic diagram of the answer selection system 106 implemented by a computing device 601 of a computing system 600 in accordance with one or more embodiments of the present disclosure. As shown, the answer selection system 106 is further implemented by the server(s) 102 and the digital content management system 104. Also illustrated, the answer selection system 106 can include an embedding generator 602, a query manager 603, a candidate answer manager 604, a context controller 606, a gated self-attention manager 608, a memory network 610, an answer prediction engine 612, a transfer learning manager 613, and a data storage manager 614.

The embedding generator 602 can handle the generating, obtaining, sending, receiving, updating, etc. of various word embeddings for the computing system 600. For example, the embedding generator 602 can convert contextual information to a context vector (e.g., as described in relation to the foregoing figures), in addition to converting a query and candidate answer together to an input vector (e.g., as also described in relation to the foregoing figures). In turn, the embedding generator 602 can pass the context vector to one or more components of the computing system 600, including the context controller 606 and/or the gated self-attention manager 608. Likewise, the embedding generator 602 can pass the input vector to one or more components of the computing system 600, including the gated self-attention output 608.

As part of the answer selection system 106, the query manager 603 can handle the receiving, generating, transcribing, transmitting, etc. of a query as described above in relation to the foregoing figures. For example, the query manager 603 can handle receiving audio data corresponding to a query, for example, as dictated by a user, and the query manager 603 can (e.g., using speech recognition capabilities) transcribe the audio data into textual form. Additionally or alternatively, the query manager 603 can receive a search request corresponding to a query document, paragraph, sentence, etc. (e.g., about which additional information is requested). In some embodiments, the query manager 603 can relay the query to one or more components within the computing system 600 (e.g., the embedding generator 602, the gated self-attention manager 608, etc.).

As also part of the answer selection system 106, the candidate answer manager 604 can handle the receiving, generating, transcribing, transmitting, etc. of a candidate answer as described above in relation to the foregoing figures. For example, the candidate answer manager 604 can handle obtaining candidate answers from a dataset (e.g., an initial training dataset or a target dataset) in response to a query received at the query manager 603.). In some embodiments, the candidate answer manager 604 can relay a candidate answer to one or more components within the computing system 600 (e.g., the embedding generator 602, the gated self-attention manager 608, etc.).

Further illustrated of the answer selection system 106, the context controller 606 can handle the receiving, generating, transcribing, transmitting, etc. of contextual information as described above in relation to the foregoing figures. For example, the context controller 606 can handle receiving audio data corresponding to a previous utterance, for example, a prior voice-assistant request, and the context controller 606 can (e.g., using speech recognition capabilities) transcribe the audio data into textual form. In some embodiments, the context controller 606 can relay the contextual information to one or more components within the computing system 600 (e.g., the embedding generator 602, the gated self-attention manager 608, etc.).

As mentioned, the answer selection system 106 further includes the gated self-attention manager 608. The gated self-attention manager 608 can determine attention output including gated self-attention output vectors using a gated neural attention mechanism previously described in the present disclosure. Additionally, the gated self-attention manager 608 can handle the obtaining, receiving, generating, determining, updating, aggregating, and/or passing of vector values (e.g., of context vectors, input vectors, etc.). With a context vector and an input vector, gated self-attention manager 608 can handle generating a gated self-attention output vector using the gated neural attention mechanism that intelligently blends together a query, a candidate answer, and contextual information. Further, for example, the gated self-attention manager 608 can handle passing the gated self-attention output vectors to one or more components of the computing system 600 (e.g., the context controller 606 and/or the memory network 610).

As mentioned, the answer selection system 106 further includes the memory network 610. The memory network 610 can handle the memory of the answer selection system 106 from hop-to-hop. For example, the memory network 610 can perform cell updates within the memory network 610 based on the gated self-attention output vector and/or a current context vector state as previously described in this disclosure. By implementing the memory network 610, the answer selection system 106 can remember previous utterances relevant to the query and/or continually refine a query-candidate answer match over multiple reasoning hops.

As further mentioned, the answer selection system 106 includes the answer prediction engine 612. The answer prediction engine 612 can handle receiving of one or more vectors to predict a match between a candidate answer and a query as previously described in this disclosure. For example, the answer prediction engine 612 can generate a probability distribution among a plurality of candidate answers that potentially correspond to the query. In some embodiments, the answer prediction engine 612 passes a final context vector state through a probability function (e.g., a softmax function) to determine the probability distribution. Based on the probabilities in the probability distribution, the answer prediction engine 612 can select a candidate answer out of the plurality of candidate answers as a match with the query.

Additionally mentioned, the answer selection system 106 includes the transfer learning manager 613. The transfer learning manager 613 can handle the transfer learning techniques as described above (e.g., in relation to FIG. 4). For example, the transfer learning manager 613 can handle training of the gated self-attention manager 608 and/or the memory network 610, in addition to handling the transfer of learning from a large-scale corpus to a target dataset for fine-tuning various learned parameters.

As also mentioned, the answer selection system 106 includes a data storage manager 614. The data storage manager 614 can handle data storage and can include neural network training data 616. The neural network training data 616 can include the initial training dataset and target dataset described above (e.g., in relation to FIG. 4). In addition, the neural network training data 616 can include various parameters that are learned and/or provided to the answer selection system 106. For example, the neural network training data 616 can include data relative to preferences, weights, biases, matrices, connections, artificial neurons, learning rates, gradients, contextual information, queries, or any other suitable data to perform the acts and algorithms of the present disclosure.

Each of the components 602-616 of the answer selection system 106 can include software, hardware, or both. For example, the components 602-616 can include one or more instructions stored on a computer-readable storage medium and executable by processors of one or more computing devices, such as a client device or server device. When executed by the one or more processors, the computer-executable instructions of the answer selection system 106 can cause the computing device(s) to perform the methods described herein. Alternatively, the components 602-616 can include hardware, such as a special-purpose processing device to perform a certain function or group of functions. Alternatively, the components 602-616 of the answer selection system 106 can include a combination of computer-executable instructions and hardware.

Furthermore, the components 602-616 of the answer selection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-616 of the answer selection system 106 may be implemented as a stand-alone application, such as a desktop or mobile application. Furthermore, the components 602-616 of the answer selection system 106 may be implemented as one or more web-based applications hosted on a remote server. Alternatively, or additionally, the components 602-616 of the answer selection system 106 may be implemented in a suite of mobile device applications or "apps." For example, in one or more embodiments, the answer selection system 106 can comprise or operate in connection with digital software applications such as ADOBE CREATIVE CLOUD and/or ADOBE MARKETING CLOUD, such as ADOBE CAMPAIGN, ADOBE ANALYTICS, and ADOBE MEDIA OPTIMIZER. Product names, including "ADOBE" and any other portion of one or more of the foregoing product names, may include registered trademarks or trademarks of Adobe Systems Incorporated in the United States and/or other countries.

FIGS. 1-6, the corresponding text, and the examples provide several different systems, methods, techniques, components, and/or devices of the answer selection system 106 in accordance with one or more embodiments. In addition to the above description, one or more embodiments can also be described in terms of flowcharts including acts for accomplishing a particular result. For example, FIG. 7 illustrates a flowchart of a series of acts 700 in accordance with one or more embodiments.

Figure 7:
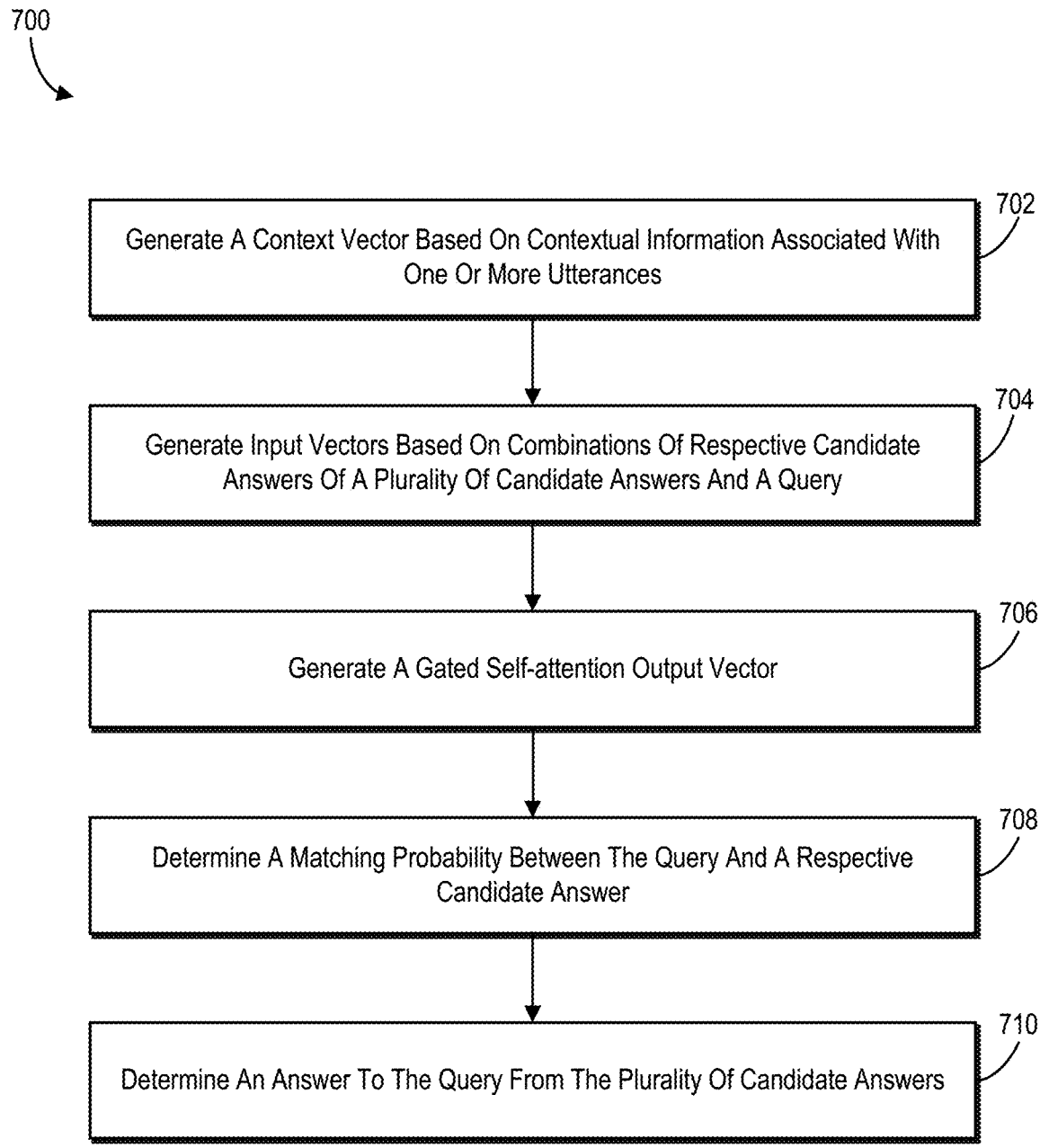
FIG. 7 illustrates a flowchart of a series of acts for determining an answer to a query in accordance with one or more embodiments.

As illustrated in FIG. 7, act 702 can include generating a context vector based on contextual information associated with one or more utterances. In some embodiments, act 702 can include generating, via a word-vector representation model, an embedding of the contextual information.

Act 704 in the series of acts 700 can include generating input vectors based on combinations of respective candidate answers of a plurality of candidate answers and a query. In some embodiments, act 704 can include generating, via a word-vector representation model, a query embedding of the query. Further, as described above, act 704 can include for each combination of a respective candidate answer and the query: generating, via the word-vector representation model, a candidate answer embedding of the respective candidate answer; and concatenating the candidate answer embedding and the query embedding.

Act 706 in the series of acts 700 can include, for each combination of a respective candidate answer and the query, generating a gated self-attention output vector based on a gated self-attention mechanism (GSAM) and the context vector. In some embodiments, act 706 can, as described above, include aggregating an input vector and the context vector both weighted by self-attention outputs of the GSAM.

Act 708 in the series of acts 700 can include, for each combination of a respective candidate answer and the query, determining a matching probability between the query and the respective candidate answer based on the gated self-attention output vector. In some embodiments, act 708 can, as described above, include determining the matching probability between the query and the respective candidate answer based on the next context vector state.

Act 710 in the series of acts 700 can include determining, based on the matching probabilities for the combinations of the respective candidate answers and the query, an answer to the query from the plurality of candidate answers.

It is understood that the outlined acts in the series of acts 700 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 7, an act in the series of acts 700 may include an act to, for each combination of a respective candidate answer and the query: generate, a next cell state of a memory network based on the GSAM, a current context vector state, and a current cell state of the memory network. As described above, in some embodiments, generating the next cell state of the memory network can include combining a dot product of the gated-self attention output vector and the current cell state of the memory network.

In another example of an additional act not shown in FIG. 7, an act in the series of acts 700 may include an act to, for each combination of a respective candidate answer and the query: generate a next context vector state based on a current gated self-attention output vector state of the GSAM, the current context vector state, and the next cell state of the memory network. As described above, in some embodiments, generating the next context vector state can include combining an average value of the next cell state with a dot product of the current gated self-attention output vector state and the current context vector state.

In yet another example of an additional act not shown in FIG. 7, an act in the series of acts 700 may include an act to, for each combination of a respective candidate answer and the query: generate an initial cell state of a memory network according to a word-vector representation model. As yet another example of an additional act not shown in FIG. 7, an act in the series of acts 700 may include an act to: initially train the GSAM using a first question-answer dataset; and tune the GSAM using a second question-answer dataset, the second question-answer dataset being a target dataset.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
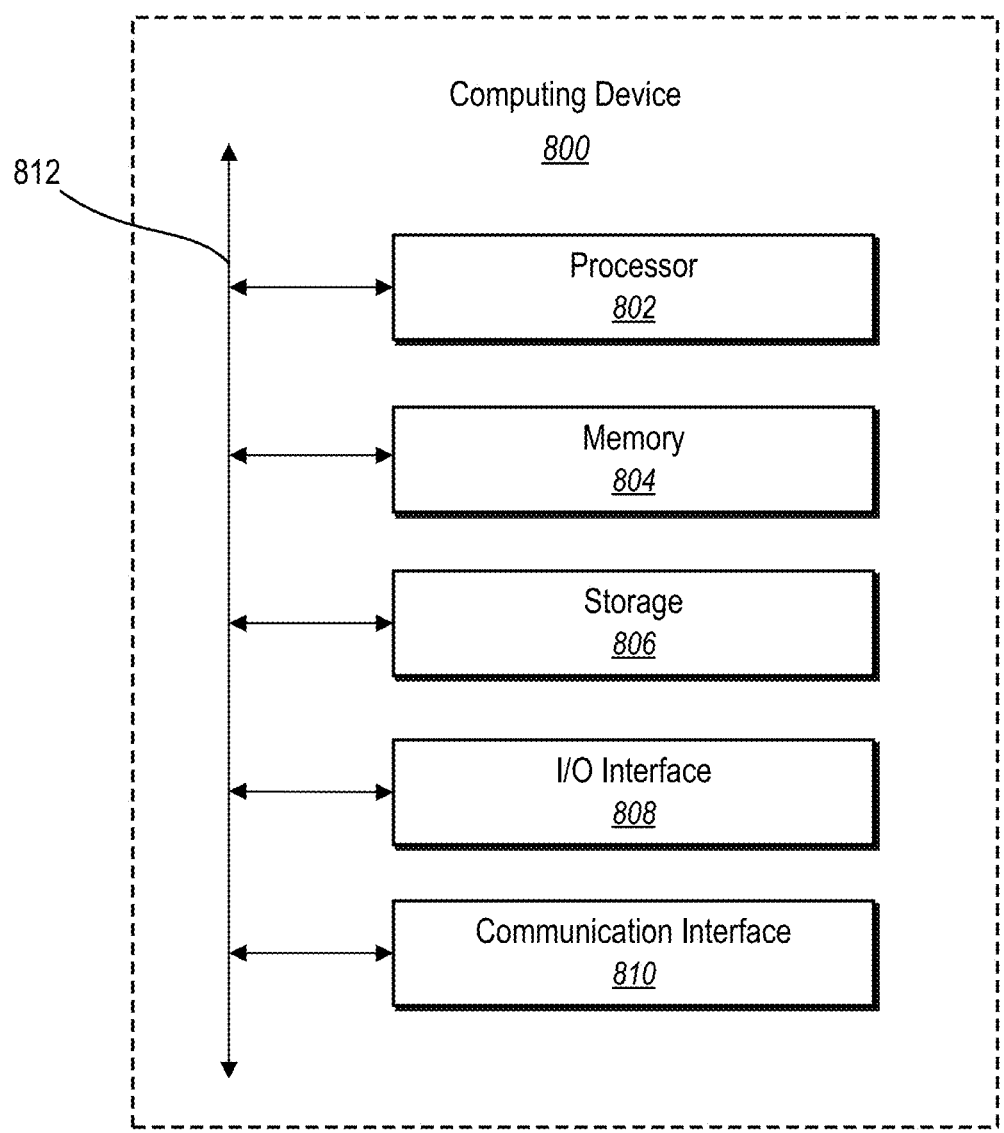
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the computing device 601, the computing device 206, the server(s) 102, and the client device 108). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    generate a context vector based on contextual information associated with one or more utterances;
    generate input vectors based on combinations of respective candidate answers of a plurality of candidate answers and a query;
    for each combination of a respective candidate answer and the query:
        generate, based on a gated self-attention mechanism (GSAM) and the context vector, a gated self-attention output vector;
        determine, based on the gated self-attention output vector, a matching probability between the query and the respective candidate answer; and
    determine, based on the matching probabilities for the combinations of the respective candidate answers and the query, an answer to the query from the plurality of candidate answers.

2. The non-transitory computer-readable medium of claim 1, wherein the instructions, when executed by the at least one processor, cause the computing device to generate the gated self-attention output vector based on the GSAM and the context vector by aggregating an input vector and the context vector both weighted by self-attention outputs of the GSAM.

3. The non-transitory computer-readable medium of claim 1, further comprising instructions that, when executed by the at least one processor, cause the computing device to:
    for each combination of a respective candidate answer and the query:
        generate, a next cell state of a memory network based on the GSAM, a current context vector state, and a current cell state of the memory network.

4. The non-transitory computer-readable medium of claim 3, further comprising instructions that, when executed by the at least one processor, cause the computing device to:
    for each combination of a respective candidate answer and the query:
        generate a next context vector state based on a current gated self-attention output vector state of the GSAM, the current context vector state, and the next cell state of the memory network.

5. The non-transitory computer-readable medium of claim 4, wherein the instructions, when executed by the at least one processor, cause the computing device to determine the matching probability between the query and the respective candidate answer based on the gated self-attention output vector by determining the matching probability between the query and the respective candidate answer based on the next context vector state.

6. The non-transitory computer-readable medium of claim 1, wherein the instructions, when executed by the at least one processor, cause the computing device to generate the input vectors based on the combinations of respective candidate answers of the plurality of candidate answers and the query by:
    generating, via a word-vector representation model, a query embedding of the query; and
    for each combination of a respective candidate answer and the query:
        generating, via the word-vector representation model, a candidate answer embedding of the respective candidate answer; and
        concatenating the candidate answer embedding and the query embedding.

7. The non-transitory computer-readable medium of claim 1, further comprising instructions that, when executed by the at least one processor, cause the computing device to:
    for each combination of a respective candidate answer and the query:
        generate an initial cell state of a memory network according to a word-vector representation model.

8. The non-transitory computer-readable medium of claim 1, further comprising instructions that, when executed by the at least one processor, cause the computing device to:
    initially train the GSAM using a first question-answer dataset; and tune the GSAM using a second question-answer dataset, the second question-answer dataset being a target dataset.

9. The non-transitory computer-readable medium of claim 1, wherein the instructions, when executed by the at least one processor, cause the computing device to generate the context vector based on contextual information associated with one or more utterances by generating, via a word-vector representation model, an embedding of the contextual information.

10. A system comprising:
one or more memory devices comprising:
a gated-self attention mechanism (GSAM);
a memory network;
a query; and
a plurality of candidate answers to the query; and
at least one server configured to cause the system to:
generate a context vector for a plurality of context vector states based on contextual information associated with one or more utterances;
generate input vectors based on combinations of respective candidate answers of the plurality of candidate answers and the query;
for each combination of a respective candidate answer and the query:
generate a next cell state of the memory network based on the GSAM, a current context vector state, and a current cell state of the memory network;
generate a next context vector state based on a current gated self-attention output vector state of the GSAM, the current context vector state, and the next cell state of the memory network; and
determine, based on the next context vector state, a matching probability between the query and the respective candidate answer; and
determine, based on the matching probabilities for the combinations of the respective candidate answers and the query, an answer to the query from the plurality of candidate answers.

11. The system of claim 10, wherein the at least one server is configured to cause the system to generate the next cell state of the memory network based on the GSAM, the current context vector state, and the current cell state of the memory network by generating a gated-self attention output vector by aggregating an input vector and the context vector both weighted by self-attention outputs of the GSAM.

12. The system of claim 11, wherein the at least one server is configured to cause the system to generate the next cell state of the memory network based on the GSAM, the current context vector state, and the current cell state of the memory network further by combining a dot product of the gated-self attention output vector and the current cell state of the memory network.

13. The system of claim 12, wherein the at least one server is configured to cause the system to generate the next context vector state based on the current gated self-attention output vector state of the GSAM, the current context vector state, and the next cell state of the memory network by combining an average value of the next cell state with a dot product of the current gated self-attention output vector state and the current context vector state.

14. The system of claim 10, wherein the at least one server is configured to cause the system to generate the input vectors based on the combinations of respective candidate answers of the plurality of candidate answers and the query by:
generating, via a word-vector representation model, a query embedding of the query; and
for each combination of a respective candidate answer and the query:
generating, via the word-vector representation model, a candidate answer embedding of the respective candidate answer; and
concatenating the candidate answer embedding and the query embedding.

15. The system of claim 10, wherein the at least one server is further configured to cause the system to:
initially train the GSAM using a first question-answer dataset; and
tune the GSAM using a second question-answer dataset, the second question-answer dataset being a target dataset.

16. A computer-implemented method comprising:
generating a context vector for a plurality of context vector states based on contextual information associated with one or more utterances;
generating input vectors based on combinations of respective candidate answers of a plurality of candidate answers and a query;
for each combination of a respective candidate answer and the query:
generating, based on a gated self-attention mechanism (GSAM) and the context vector, a gated self-attention output vector;
generating, based on the gated self-attention output vector, a next cell state of a memory network;
generating, based on a current gated self-attention output vector state of the GSAM and the next cell state of the memory network, a next context vector state; and
determining, based on the next context vector state, a matching probability between the query and the respective candidate answer; and
determining, based on the matching probabilities for the combinations of the respective candidate answers and the query, an answer to the query from the plurality of candidate answers.

17. The computer-implemented method of claim 16, wherein generating the next cell state of the memory network based on the gated self-attention output vector comprises combining a dot product of the gated self-attention output vector and a current cell state of the memory network.

18. The method of claim 16, wherein generating the next context vector state based on the current gated self-attention output vector state and the next cell state of the memory network comprises combining an average value of the next cell state with a dot product of the current gated self-attention output vector state and a current context vector state.

19. The method of claim 16, wherein generating the gated self-attention output vector based on the GSAM and the context vector comprises aggregating an input vector and the context vector both weighted by self-attention outputs of the GSAM.

20. The method of claim 16, further comprising:
initially training the GSAM using a first question-answer dataset; and
tuning the GSAM using a second question-answer dataset, the second question-answer dataset being a target dataset.

* * * * *